United States Patent [19]
Cichy

[11] Patent Number: 5,669,307
[45] Date of Patent: Sep. 23, 1997

[54] TRANSPORTATION VEHICLE HAVING DOORS WITH DOORSILLS AT DIFFERENT LEVELS

[76] Inventor: Gerald R. Cichy, 1 Halifax Ct., Rockville, Md. 20850-3009

[21] Appl. No.: 595,243

[22] Filed: Feb. 1, 1996

[51] Int. Cl.[6] .............................. B61B 1/02; B62D 31/02
[52] U.S. Cl. ........................ 104/28; 296/178; D12/84
[58] Field of Search ................................ 296/178, 179; D12/84; 104/27, 28, 30; 105/341, 343, 397, 398

[56] References Cited

U.S. PATENT DOCUMENTS

| | | | |
|---|---|---|---|
| D. 76,392 | 9/1928 | Halloway | D12/84 |
| D. 119,315 | 3/1940 | Allen | D12/84 |
| D. 154,806 | 8/1949 | Ramstrum | D12/84 |
| D. 182,998 | 6/1958 | Gegoux et al. | D12/84 |
| D. 196,905 | 11/1963 | Dardenne | D12/84 |
| D. 198,526 | 6/1964 | Nallinger et al. | D12/84 |
| D. 225,983 | 1/1973 | Gollwitzer et al. | D12/84 |
| D. 255,340 | 6/1980 | Flesche | D12/84 |
| D. 268,997 | 5/1983 | Dubernard | D12/84 |
| D. 302,255 | 7/1989 | Manning | D12/84 |
| 1,457,190 | 5/1923 | Shave | 296/178 |
| 1,798,011 | 3/1931 | Cernuda | 296/178 |
| 3,019,047 | 1/1962 | Ahrens | 296/178 |
| 3,779,596 | 12/1973 | Ritter | 296/179 |
| 4,274,190 | 6/1981 | Slattery | 296/178 X |
| 4,469,369 | 9/1984 | Belik et al. | 296/197 |
| 4,596,192 | 6/1986 | Förster | 104/307 |

FOREIGN PATENT DOCUMENTS 2508465  9/1976  Germany ........................ 296/178

OTHER PUBLICATIONS

*The Business of Sustainable Cities*, The World Bank, Second Annal World Bank Conference on Environmentally Sustainable Development, Sep. 1994, Ismail Serageldin et al.

*Primary Examiner*—Andrew C. Pike
*Attorney, Agent, or Firm*—Roylance, Abrams, Berdo & Goodman, L.L.P.

[57] ABSTRACT

A motor vehicle includes a vehicle body supported above ground level by wheels. A first door on the vehicle body curb side has a doorsill at one level. A door on the vehicle body street side has a doorsill at a different level, spaced by a greater distance above the ground level. A driver station in the vehicle body has a door control for controlling the opening and closing of the doors from the driver station. The vehicle can be employed in a transportation system with stations having different platform levels at heights corresponding to the different levels of the two doorsills.

11 Claims, 2 Drawing Sheets

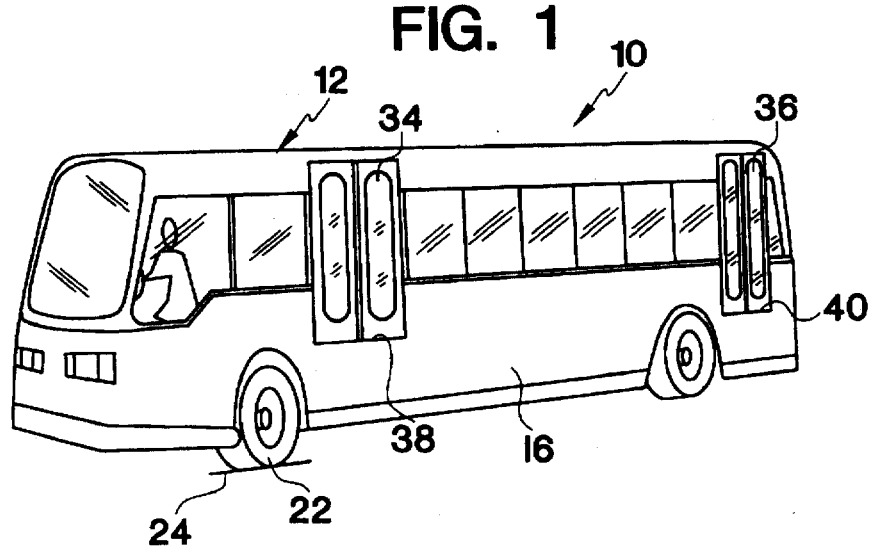
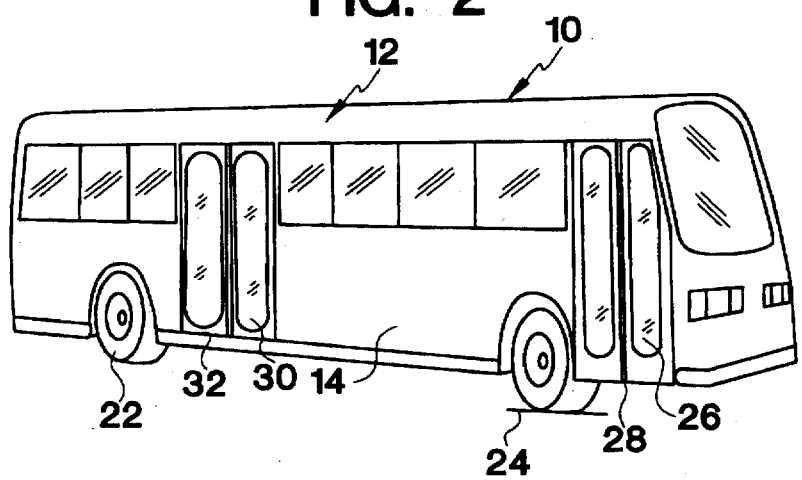
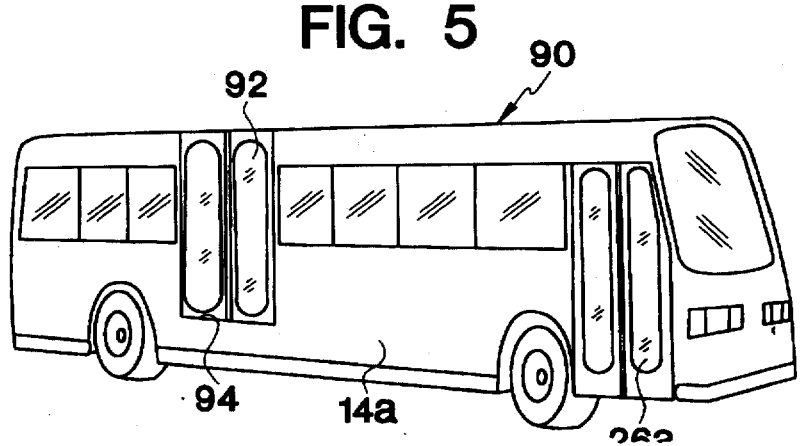

TRANSPORTATION VEHICLE HAVING DOORS WITH DOORSILLS AT DIFFERENT LEVELS

FIELD OF THE INVENTION

The present invention relates to a mass transportation vehicle having doors with doorsills at different levels. These doors permit the vehicle to be used in a transportation system for loading and discharging passengers at different platform levels.

BACKGROUND OF THE INVENTION

Transportation problems are particularly acute between urban areas and surrounding suburban areas. Light and commuter rail or train systems, such as subway systems, are particularly good in urban areas. The dedicated right-of-ways and the use of electric power are particularly advantageous. However, such train or rail systems are relatively inflexible in that they must maintain the same route and can only stop at fixed station points. Users of such rail systems still need to travel between the fixed station points and their original departure points or ultimate destinations.

Traditional bus systems operating on public roads can essentially provide door to door service from the initial embarkation point to the ultimate destination. Additionally, bus systems are flexible in that the station points and the routes can be easily adapted to accommodate changing ridership patterns. Bus systems of this type are disadvantageous in that they use the same roadways and highways as other vehicles, and thus, are subject to the same traffic congestion problems.

Current transportation systems employ buses for transporting passengers between embarkation and destination points, and railway stations. However, due to the configuration of conventional buses, the conventional buses cannot discharge the passengers directly on a subway platform without substantial modification of the roadway or subway station.

Railway stations, particularly for subway systems, have elevated platforms. Such elevated platforms are essentially coplanar with the doorsills of the subway passenger cars. For outdoor stations, typically those provided in median areas of highways, the station platform levels are spaced substantially above the roadway level. Bus stops or stations are usually located at curb side, which are substantially at the same level or slightly above the level of the roadway. Conventional buses cannot load and discharge passengers at different levels.

SUMMARY OF THE INVENTION

An object of the present invention is to provide a motor vehicle having doors with door sills at different levels to facilitate loading and discharging of passengers at different platform levels.

Another object of the present invention is to provide a vehicle to effectively and rapidly transfer passengers between a road vehicle and a tracked vehicle.

The foregoing objects are basically obtained by a motor vehicle comprising a vehicle body with first and second doors and a driver station. The vehicle body has a plurality of seats, a floor, a curb side, and a street side. Wheels support the vehicle body above the ground. The first door is on the curb side, of the vehicle body and has a first doorsill at a first level. The second door is on the street side of the vehicle body and has a second doorsill at a second level. The second level is spaced by a greater distance from the ground level than the first level. The driver station has door control means for controlling opening and closing of the doors from the driver station.

The foregoing objects are also basically obtained by a transportation system comprising a road vehicle, a first station having a first platform level, and a second station having a second platform level. The road vehicle includes a road vehicle body with a plurality of seats, a floor, a curb side, and a street side. Wheels support the road vehicle above a road level. A first door on the curb side of the road vehicle body has a first doorsill at a first level above the ground level. A second door on the street side of the road vehicle body has a second doorsill at a second level above the road level. The first and second levels are at different distances from the road level. The first platform level is substantially spaced from the second level and is relatively close to the first level. The second platform level is substantially coplanar with the second level.

By forming the motor vehicle and transportation system in this manner, the motor or road vehicle can effectively and rapidly transport passengers to and from fixed railway stations.

To effectively use mass transportation motor or road vehicles, such as buses, for transporting passengers to and from the fixed elevated train or tracked vehicle station platforms and bus stops adjacent the road level, the present claimed invention employs doors with doorsills at different levels to accommodate the bus stop and subway platform levels. Specifically, the first door on the curb side of the vehicle is located at the ground or road level to load and discharge passengers at the bus stops. The second door, with its doorsill at an elevated level, can be used to load and discharge passengers directly on the platform level on the street side of the vehicle. Thus, the vehicle can pick up and discharge passengers from bus stops on the curb side level and pick up and discharge passengers from elevated platforms on the street side of the vehicle. To avoid injury to passengers resulting from entering or leaving a vehicle at the wrong level, the first and second doors are independently controlled by the driver or operator at the driver station by the door control means.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a perspective view of a motor or road vehicle according to the first embodiment of the present invention, showing the vehicle street side;

FIG. 2 is a perspective view of the vehicle of FIG. 1 showing the vehicle curb side;

FIG. 5 is a perspective view of a motor or road vehicle according to a second embodiment of the present invention, showing the vehicle curb side.

DETAILED DESCRIPTION OF THE INVENTION

Figure 3:
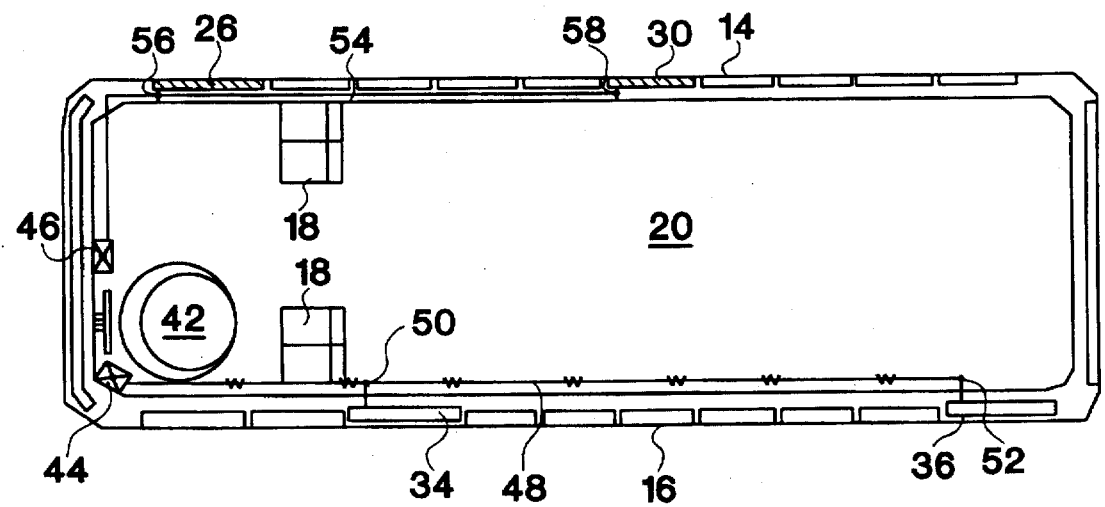
FIG. 3 is a top plan view in section of the vehicle of FIG. 1, with seats removed.

Referring initially to FIGS. 1-3, a motor or road vehicle 10 according to a first embodiment of the present invention is a bus and comprises a vehicle body 12 with a curb side 14 and a street side 16. The vehicle body includes an interior with seats 18 and a floor 20.

In the conventional manner, the vehicle body is supported by steering and power-driven wheels 22. The wheels support the vehicle body above a ground or road level 24.

A door 26 is provided on vehicle curb side 14. Door 26 is generally of conventional construction and has a doorsill or threshold 28. Doorsill 28 is located at a first level. A second conventional curb side door 30 is also located on the vehicle body. Door 26 is located adjacent the front of the vehicle, while door 30 is located adjacent the rear of the vehicle. Door 30 has a doorsill 32 essentially coplanar with doorsill 28.

Street side 16 of the vehicle body has doors 34 and 36. Doors 34 and 36 have doorsills 38 and 40, respectively. Doorsills 38 and 40 are essentially coplanar with vehicle floor 20 and are at a second level spaced above ground level 24 by a distance greater than the spacing of the first level from the ground level.

As best illustrated in FIG. 3, the vehicle body interior includes a driver station 42. The driver station includes street side door control means 44 and curb side door control means 46. Door control means 44 is coupled via lines 48 to door mechanisms 50 and 52. As graphically illustrated in FIG. 3, door mechanism 50 is coupled to door 34 for opening and closing door 34. Similarly, door mechanism 52 is coupled to door 36 for opening and closing door 36.

Door control means 46 is coupled by line 54 to door mechanisms 56 and 58. Door mechanism 56 is coupled to door 26 for opening and closing door 26. Door mechanism 58 is coupled to door 30 for opening and closing door 30.

The door control means and the door mechanisms are conventional, and thus, are not described further in detail. By providing these two separate and independent control means at the driver station, the driver can independently actuate or control opening of the curb side doors or the street side doors, depending on the platform level at which the vehicle is stopped for loading and/or discharging passengers.

Figure 4:
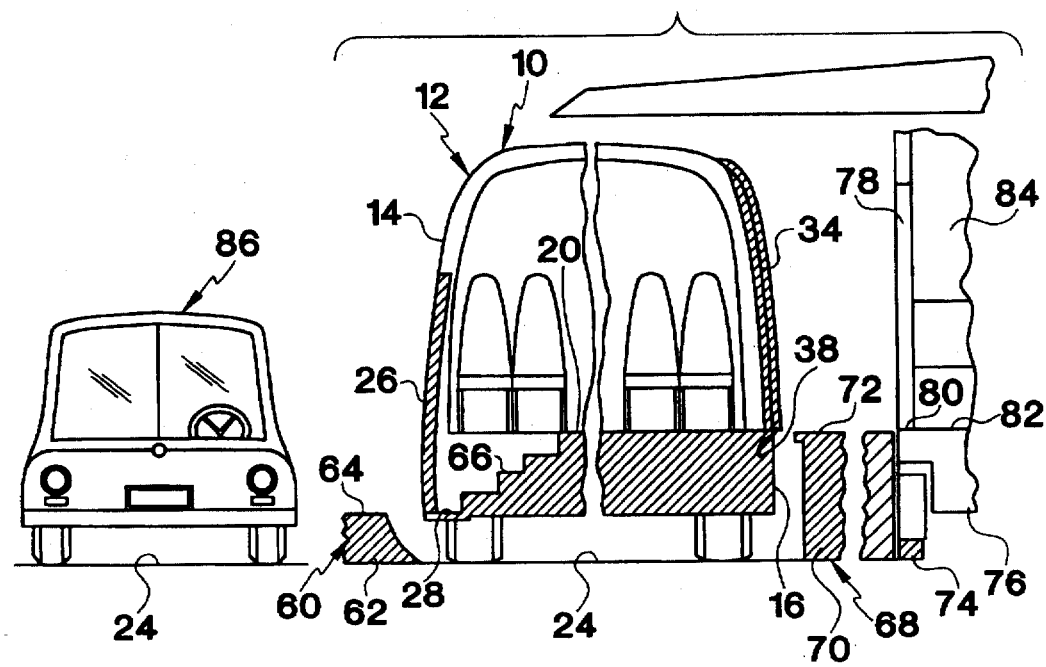
FIG. 4 is a front elevational view, in section, of the vehicle of FIG. 1 in combination with bus and rail stations, another road vehicle, and a tracked vehicle.

A transportation system including the motor or road vehicle 10 is graphically illustrated in FIG. 4. The vehicle curb side 14 is illustrated adjacent a bus stop 60, graphically illustrated with a curb or sidewalk 62 having an upper surface or platform level 64. Platform level 64 is adjacent to or spaced slightly above road level 24, and is generally coplanar with doorsill 28.

When vehicle 10 stops at bus stop 60, passengers on platform level 64 can enter through a doorway provided by opening door 26 and/or door 30 by stepping onto doorsill 28 or 32. The passengers can then ascend to vehicle body floor 20 by climbing stairs 66. Passengers can exit vehicle 10 by descending the stairs, passing through the door 26 or 30, and stepping from doorsill 28 or 32 to platform level 64. Since doorsills 28 and 32 are adjacent ground or road level 24, passengers can also pass through the doorway provided by opening door 26 or 30 and step up or down from doorsill 28 or 32 directly to road or ground level 24.

When vehicle 10 arrives at a train station 68 or tracked vehicle station platform, the passengers enter and exit vehicle 10 on street side 16 through doors 34 and 36. Train station 68 includes a platform 70 with an upper platform surface or level 72. Platform level 72 is essentially coplanar with doorsills 38 and 40 to permit passengers to easily enter and exit the vehicle through the passageways provided by opening doors 34 and 36.

Platform 70, on its side opposite vehicle 10, has train tracks 74 forming means for receiving and restricting movement of subway train 76. The cars of train 76 have doors 78 with doorsills 80. Each car of train 76 has an interior cabin with a floor 82 and seats 84. Train doorsills 80 are essentially coplanar with platform level 72 and floor 82, as conventional for subway trains.

In use, vehicle 10 travels along public roads and highways and stops at various bus stops. Passengers can then enter and exit the vehicle through doors 26 and 30 from the ground or road way level 24 or from a slightly elevated platform level 64. At each bus stop, the driver will control the opening of doors 26 and 30 by door control means 46. Doors 34 and 36 are maintained closed by door control means 44.

Upon arrival at a train station or tracked vehicle platform, passengers can enter and exit the vehicle through doors 34 and 36, with the driver controlling the opening of those doors by control means 44. Doors 26 and 30 are maintained closed by door control means 46. The passengers enter and exit the vehicle on the level of floor 20 directly on platform level 72 to facilitate travelling to and from train 76.

For comparison purposes, an automobile 86 is graphically illustrated showing use of vehicle or bus 10 on a roadway with the automobile.

A second embodiment of the motor or road vehicle in illustrated in FIG. 5. Bus 90 is similar to bus 10, except door 30 is replaced by door 92 adjacent the rear end of vehicle curb side 14a. Door 92 has a doorsill 94 at the level of the vehicle floor and the elevated platform. Door 92 would be controlled separately from front door 26a on curb side 14, and would allow entry and exit of passengers from vehicle 92 on the curb side, as well as the street side, at the height of the platform level or at a level coplanar with the vehicle floor.

While various embodiments have been chosen to illustrate the invention, it will be understood by those skilled in the art that various changes and modifications can be made therein without departing from the scope of the invention as defined in the appended claims.

What is claimed is:

1. A transportation system comprising: a road vehicle having a road vehicle body with a plurality of seats therein, a floor, a curb side, and a street side, wheels on said road vehicle body supporting said road vehicle body above a road level, a first door on said curb side of said road vehicle body having a first doorsill at a first level above the road level, and a second door on said street side of said road vehicle body having a second doorsill at a second level above the road level, said first and second levels being at different distances from the road level;

a first station having a first platform level substantially spaced from said second level and relatively close to said first level;

a second station having a second platform level substantially coplanar with said second level; and a tracked vehicle operating through said second station, said tracked vehicle having a tracked vehicle body with at least one seat therein, a floor, and at least one door with a doorsill at a level substantially coplanar with said second platform level and said floor of said tracked vehicle body.

2. A transportation system according to claim 1 wherein said road vehicle body further comprises a driver station having door control means for controlling opening and closing of said doors of said road vehicle from said driver station.

3. A transportation system according to claim 1 wherein said second doorsill and said floor of said road vehicle body are substantially coplanar.

4. A transportation system according to claim 3 wherein said first doorsill is spaced between and from the road level and said floor of said road vehicle body.

5. A transportation system according to claim 1 wherein said road vehicle body comprises a bus.

6. A transportation system according to claim 1 wherein said road vehicle further comprises a third door on said street side of said road vehicle body having a third doorsill at said second level.

7. A transportation system according to claim 1 wherein said road vehicle further comprises a third door on said curb side of said road vehicle body having a third doorsill at said first level.

8. A transportation system according to claim 1 wherein said road vehicle further comprises a third door on said curb side of said road vehicle body having a third doorsill at said second level.

9. A transportation system according to claim 1 wherein said tracked vehicle is a train riding on a train track.

10. A transportation system according to claim 1 wherein said second station is connected to a means for receiving and restricting movement of said tracked vehicle.

11. A transportation system according to claim 10 wherein said tracked vehicle is a train; and said means is a train track.

* * * * *